United States Patent [19]
Dinverno

[11] Patent Number: 6,120,234
[45] Date of Patent: *Sep. 19, 2000

[54] VAN-MOUNTED SERVICE CARTS FOR SKILLED TRADESMEN AND RAMP MECHANISMS FOR USE WITH THE SAME

[76] Inventor: Daniel Dinverno, 7511 Intervale, Detroit, Mich. 48238-2401

[*] Notice: This patent is subject to a terminal disclaimer.

[21] Appl. No.: 08/467,694

[22] Filed: Jun. 6, 1995

Related U.S. Application Data

[60] Continuation-in-part of application No. 08/012,014, Feb. 1, 1993, Pat. No. 5,423,651, which is a division of application No. 07/654,213, Feb. 12, 1991, Pat. No. 5,183,372.

[51] Int. Cl.[7] ................................................. B65G 67/02
[52] U.S. Cl. .......................... 414/538; 414/537; 414/571; 414/500; 14/71.1
[58] Field of Search ........................ 414/537, 538, 414/346, 571, 522, 498, 499, 500; 14/69.5, 71.1, 71.3, 72.5; 193/6

[56] References Cited

U.S. PATENT DOCUMENTS

| | | | |
|---|---|---|---|
| 3,524,412 | 8/1970 | Wilson | 104/134 |
| 3,977,545 | 8/1976 | Lloyd | 414/537 |
| 4,078,678 | 3/1978 | Tordella . | |
| 4,529,349 | 7/1985 | Lutz | 414/478 |
| 4,601,632 | 7/1986 | Agee | 414/537 |
| 4,624,619 | 11/1986 | Uher | 414/537 |
| 4,685,857 | 8/1987 | Goeser et al. | 414/537 X |
| 4,715,769 | 12/1987 | Kirtley | 414/538 X |
| 4,740,132 | 4/1988 | Peyre | 414/494 |
| 4,749,317 | 6/1988 | Daniel | 410/26 |
| 4,900,217 | 2/1990 | Nelson | 414/537 |
| 4,930,799 | 6/1990 | Pihlstrom | 280/400 |
| 4,958,978 | 9/1990 | Shedleski | 414/483 |
| 5,020,960 | 6/1991 | Provenson | 414/494 |
| 5,232,329 | 8/1993 | Livingston | 414/494 |
| 5,326,215 | 7/1994 | Eberhardt | 414/563 |
| 5,331,701 | 7/1994 | Chase et al. | 414/537 X |

*Primary Examiner*—Frank E. Werner
*Attorney, Agent, or Firm*—Young and Basile

[57] ABSTRACT

A service cart transportable in a van or truck is comprised of a vertically oriented pyramid-shaped profile. The pyramid shape offers a high degree of stability, making it virtually impossible to tip over during normal operating conditions, especially during transport. The cart has a four-wheel base. One set of wheels is preferably swivel casters for turning sharp corners. A second set of wheels is larger and located externally of the cart. These wheels increase the base of the pyramid profile and add to the cart's stability. The service cart may be transported to and from a job site. The cart fits into a van or truck bed. To remove the cart from the vehicle, a ramp system is provided. A mechanical or electrical winch may be used to transport the cart into or out of the vehicle.

21 Claims, 6 Drawing Sheets

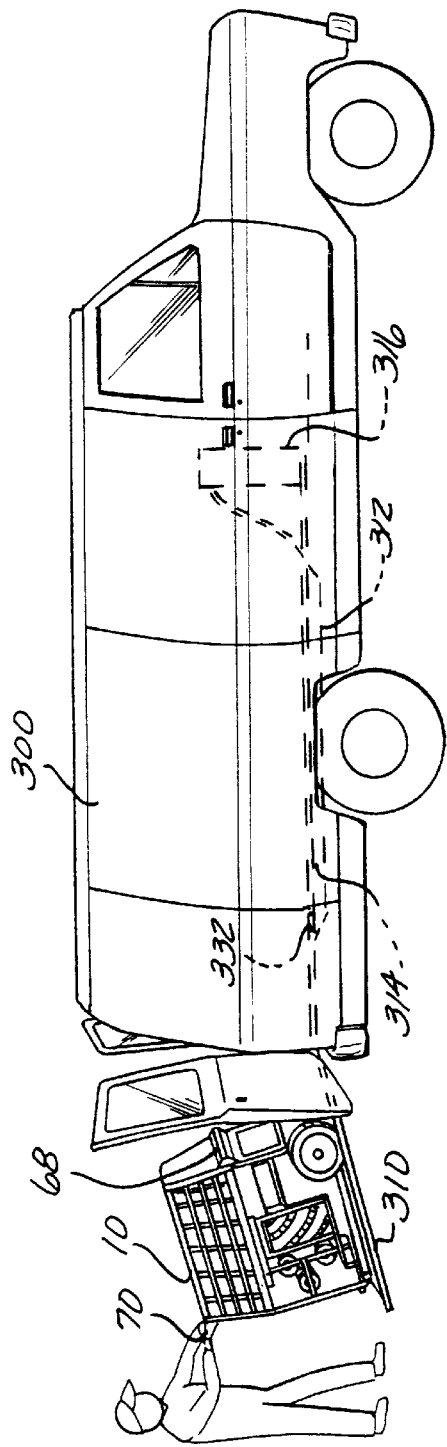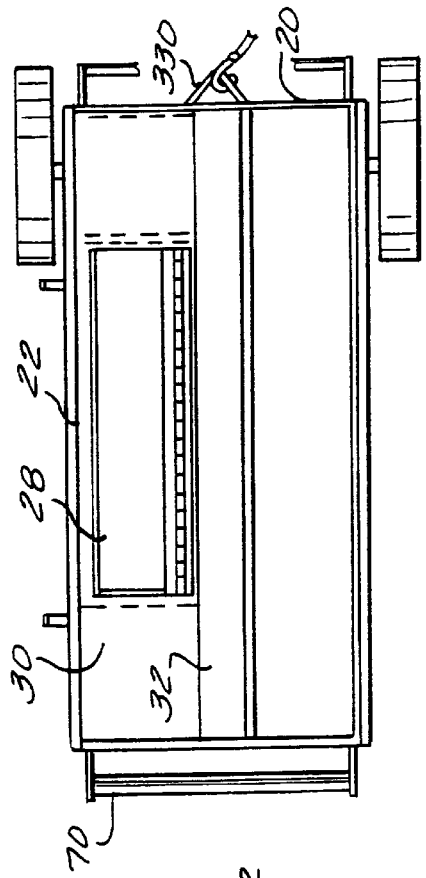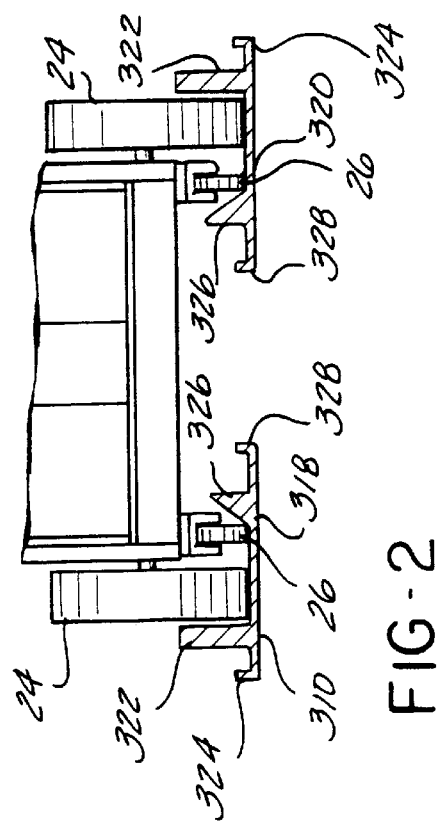

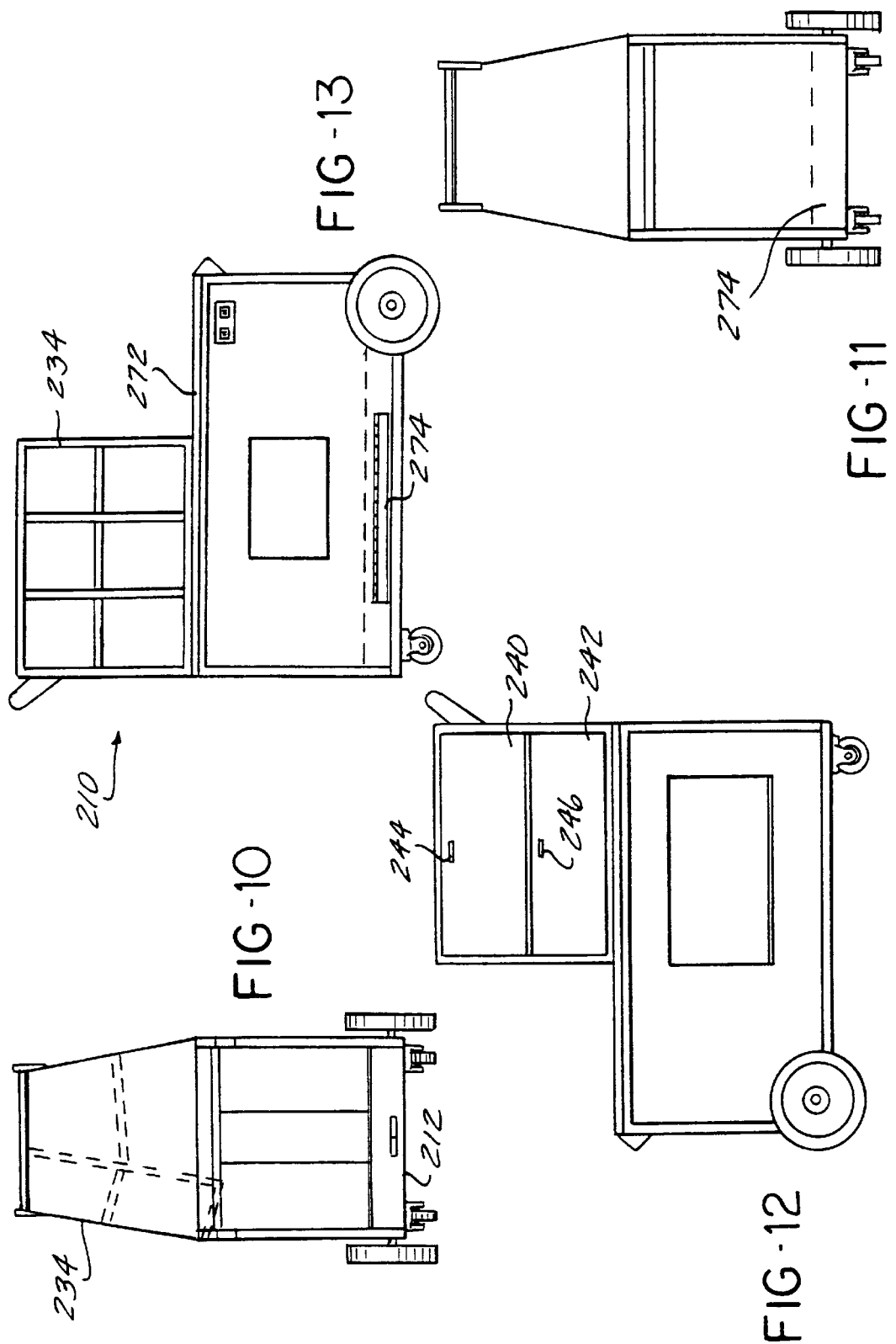

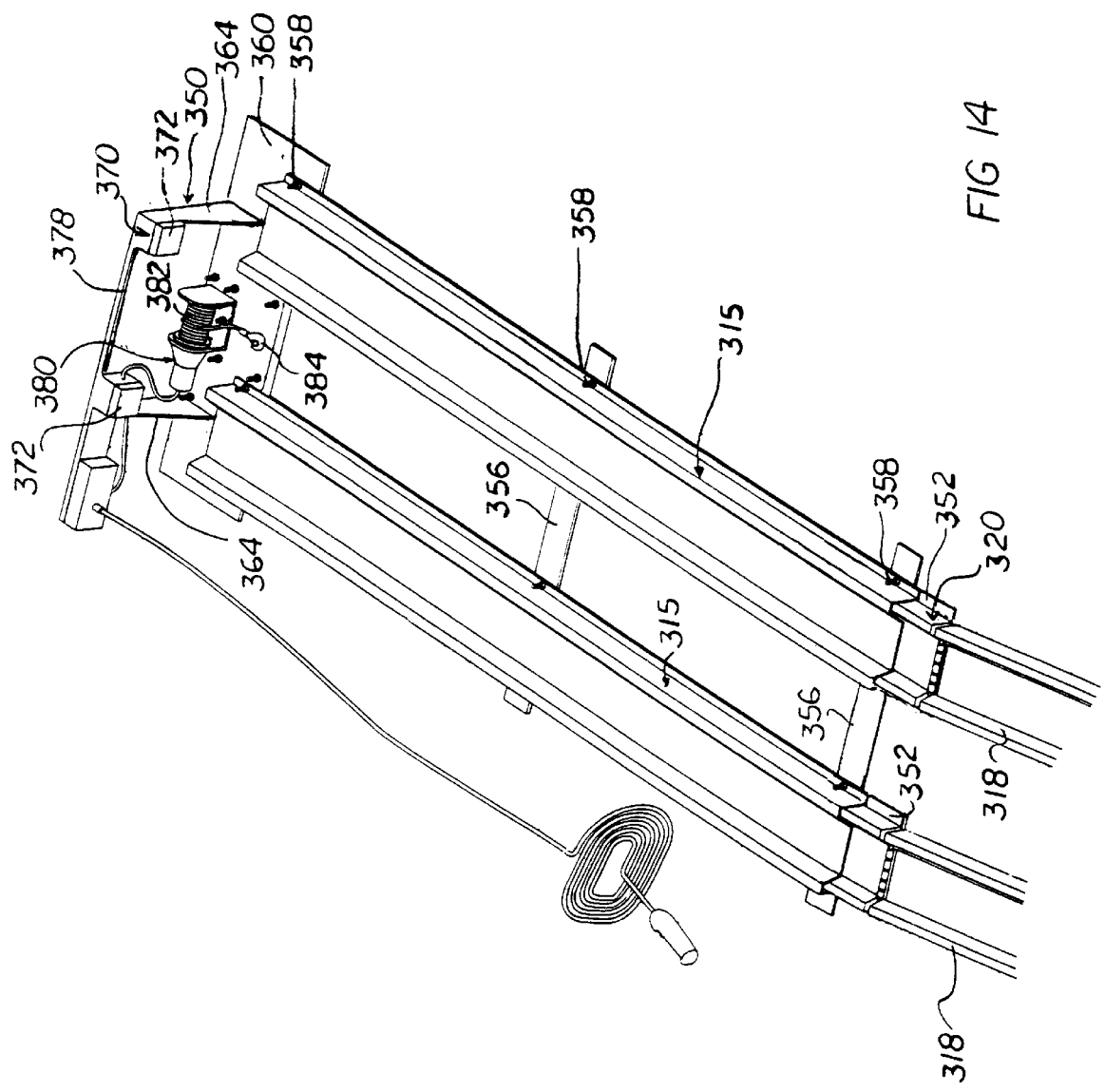

VAN-MOUNTED SERVICE CARTS FOR SKILLED TRADESMEN AND RAMP MECHANISMS FOR USE WITH THE SAME

RELATED APPLICATIONS

This application is a continuation in part of Ser. No. 08/012,014 filed Feb. 1, 1993 U.S. Pat. No. ,5423,651 which itself is a divisional application 07/654,213 filed Feb. 12, 1991 which issued as U.S. Pat. No. 5,183,372 on Feb. 2, 1993.

BACKGROUND OF THE INVENTION

I. Field of the Invention

The present invention relates to service carts for skilled tradesmen. More particularly, the present invention relates to service carts that are transportable in a van or truck to be used as a mobile storage unit on a job site and ramp devices for use in conjunction with a van or truck.

II. Description of the Prior Art

At present, the efficiency of mobile skilled trade and service personnel has been severely hampered due to problems associated with the transportation of essential tools and materials from the van or service vehicle to the point at the job site where they are needed. Most contractors or tradesmen have shelving or drawer units within or about their vehicles to organize their tools and materials. The shelving on the vehicles allows the tradesmen to transport their tools to the job site. However, once at the job site, the tradesmen must physically carry the tools from the vehicle to the actual working area.

The task of transporting the needed equipment and tools to the work site can be laborious, time-consuming and an inefficient process since it usually entails many trips back and forth to the service vehicle. As a result, the tools and equipment may be deposited in a haphazard manner over an area of floor space on the job site. This may result in the misplacement or loss of several tools.

As the work progresses during the day, additional trips back and forth to the service vehicle may be required as unexpected tools or materials may be needed to complete a job. At the end of the workday, the entire tool unloading process must be reversed. This process consumes several valuable hours of a skilled tradesman's day for which he may be working or traveling home.

Several service carts are available on the market at the present time to assist in solving this material-handling problem. One such service cart is described in U.S. Pat. No. 2,981,549 to Hotton. This mobile tool stand is comprised of a multi-drawer rectangular housing with a four-wheeled base. A handle extends from the upper end of the housing for transporting the cart. Another common service cart available on the market is comprised of single or multi-tiered storage areas with two fixed and two swivel casters for moving the unit about the work area. These types of service carts are designed solely for "in-house" use. The structure of these carts is unsuitable for transportation over rough, unlevel parking areas. Further, the profile of these carts and their corresponding wheel bases will not structurally support travel within a vehicle at higher rates of speed without tipping or spilling the stored tools.

Another type of mobile service container presently available for use by tradesmen is commonly known as a "gang box." This is a container formed of a heavy steel enclosure that provides a single internal common storage area. The gang box is not equipped with a wheel base, therefore, it is used specifically for jobs of long duration and stored at the job site.

A disadvantage of these previously known service carts and containers is the inability to transport the carts from the tradesman's garage or storage area into his vehicle and then to the job site. A further disadvantage of the service carts is their unstable profile which prevents them from being transported across rough surface areas, such as those typically found on a job site, without tipping or spilling tools or equipment.

SUMMARY OF THE INVENTION

The present invention provides a service cart which overcomes the disadvantages of the previously known service carts.

The service cart of the present invention is formed of a housing having a vertically oriented pyramid shape. This profile offers a high degree of stability and resistance, making it virtually impossible to tip over, especially during transportation to or from a job site.

The service cart of the present invention generally comprises multiple storage areas for holding and storing equipment needed by a tradesman to perform his job. These storage areas conform to the pyramid profile of the cart thus offering ease of access to these areas since entry is gained through a tapered aperture rather than a perpendicular entry.

The service cart has one or more pairs of fixed or retractable hangers extending at right angles from the tapered plane of the cart's side. These hangers are suitable for use in transporting a ladder or any other long narrow object, such as a bundle of conduit. As the hangers are perpendicular to the tapered sides of the cart, they create an acute angle with the base of the cart. This creates a more secure storage area as the acute angle prevents the equipment from sliding off the hangers.

An opposing set of wheels extends from the base of the cart. One set of wheels is comprised of offset swivel casters. This allows the cart to be turned around sharp corners. The opposing set of wheels are larger and located externally of the cart. These larger wheels contribute to the stabilization of the cart as they widen the overall base of the pyramid shape. Further, these larger wheels act as a bumper, preventing the cart from damaging interior walls as the obstructions will strike the protruding wheels before the cart itself.

The cart may be created with specific embodiments to accommodate certain specialized trades. In this regard, special carts are made available for electricians, plumbers, finish carpenters, etc. Each cart is comprised of the general embodiments described above and further includes special storage areas to accommodate the special tools required with each trade.

Specifically, the electrician's cart is provided with dowel-like pins extending the width of the cart for storing electrical wire. A storage space is provided for storing a conduit bender. A work service area extends the length of the cart for accessing more regularly used tools and equipment.

The plumber's cart, like the electrician's cart, is provided with dowel-like pins which extend parallel with the sides of the cart for storing coiled copper or flexible plastic tubing. Further, a storage area is provided for storing an acetylene tank, including a hose and gauge.

Finally, the carpenter's cart is provided with a flat surface for mounting large equipment, such as a miter saw, which may be needed for use on the job site. A storage area is also provided for storing an air compressor and its corresponding hoses. This cart is narrower in its overall width than the plumber's or electrician's cart to accommodate narrow hallways and tight corners in homes.

To transport the carts in and out of a vehicle, a ramp system, stored within the vehicle, is preferred. The ramp is preferably stored in a housing secured to the floor of the vehicle which defines a drawer-like space extending immediately above the floorboard of the vehicle having dimensions suitable to accommodate the ramp when stored. An electrical or mechanical winch may also be installed at the front end of the truck bed or van to winch the service cart onto the floor of the vehicle. A hook is provided at the base of the cart for attachment to the winch.

To transport the service cart in or out of a vehicle, the ramp is withdrawn from the drawer area to the exterior of the vehicle. A stop or trip dog is provided on the end of the ramp to prevent the tradesman from pulling the ramp completely out of the storage drawer area. The winch is hooked to the front of the service cart and activated to lower or lift the cart along the ramp. In the preferred embodiment, one cart is transported into or out of the vehicle at a time. However, it is within the purview of this invention to modify the mechanism to permit several carts to be transported into or out of the vehicle at one time. This could be accomplished by aligning the carts piggyback. In such instances, the winch could be drawn underneath the forward carts and hooked to the outermost cart. In this way, the outermost cart supports the line of movement of the foremost carts up or down the ramp.

The ramp system is comprised of two separate planks each having a profile to accommodate the rotation of the two types of wheels provided with the service cart. Each plank may have a rectangular extrusion at its outermost edge to accompany the rotation of the larger front wheels. A triangular extrusion is also provided to accommodate the rotation of the swivel casters.

Each of the above carts may also be equipped with a handle, preferably collapsible, for ease of movement of the cart by the tradesman. Further, the cart may be provided with electrical sockets for plugging in power tools. Finally, some or all of the storage areas provided in the cart are lockable to allow storage of more expensive power tools needed by the trades and prevent pilfering of the hardware contained within the cart if it is to be left unattended.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which:

FIG. 1 is a perspective view illustrating a preferred embodiment of the present invention being transported from a vehicle;

FIG. 2 is an end view of a profile of the first embodiment of the ramp used in transporting the present invention;

FIG. 3 is a top elevational view illustrating a preferred embodiment of the present invention;

FIG. 10 is a front elevational view of a third preferred embodiment of the present invention;

FIG. 11 is a rear elevational view of FIG. 10;

FIG. 12 is a right side elevational view of FIG. 10;

FIG. 13 is a left side elevational view of FIG. 10;

FIG. 14 is a perspective view of the second embodiment of the ramp device of the present invention with the elongated planks extended.

DETAILED DESCRIPTION OF THE PREFERRED EMBODIMENTS

Figure 4:
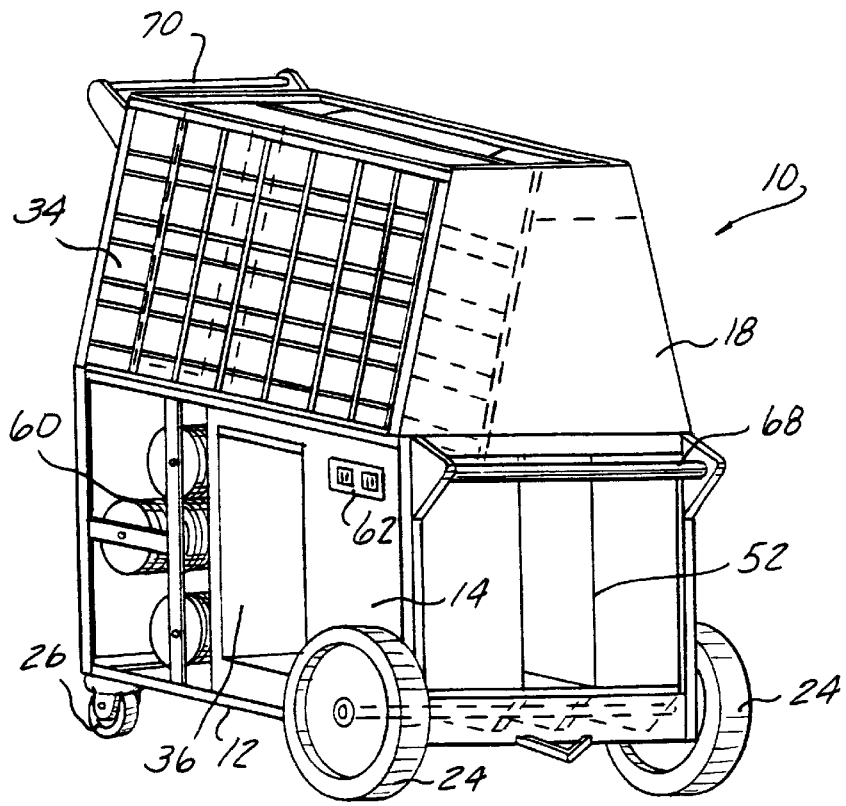
FIG. 4 is a front elevational view illustrating a first preferred embodiment of the present invention.
Figure 5:
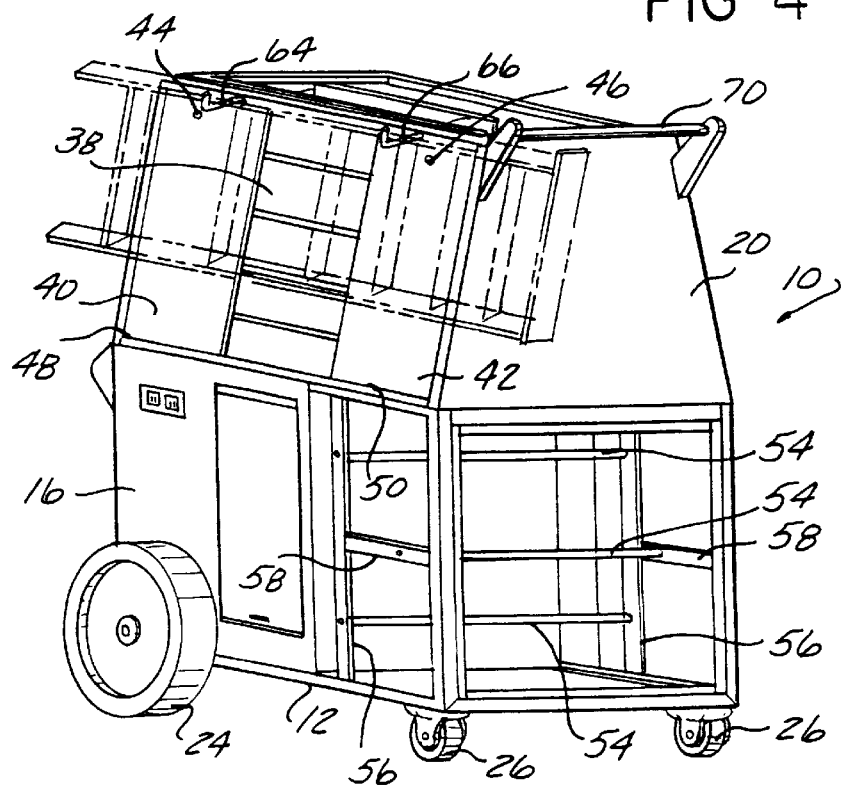
FIG. 5 is a rear elevational view of FIG. 4.
Figure 6:
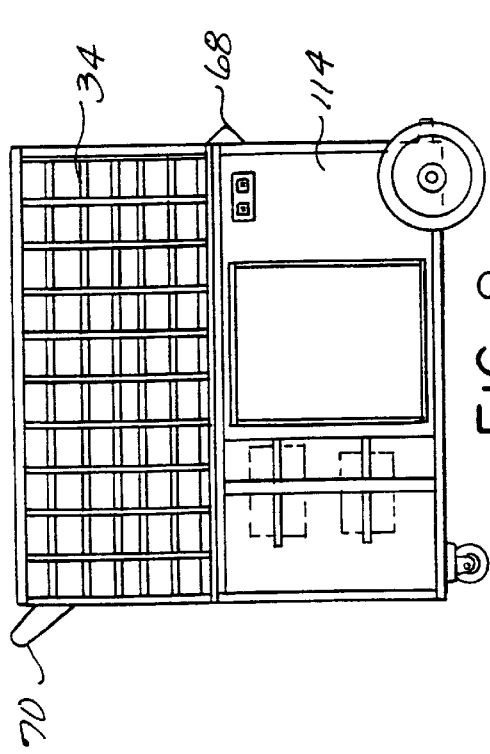
FIG. 6 is a front elevational view of a second preferred embodiment of the present invention.
Figure 8:
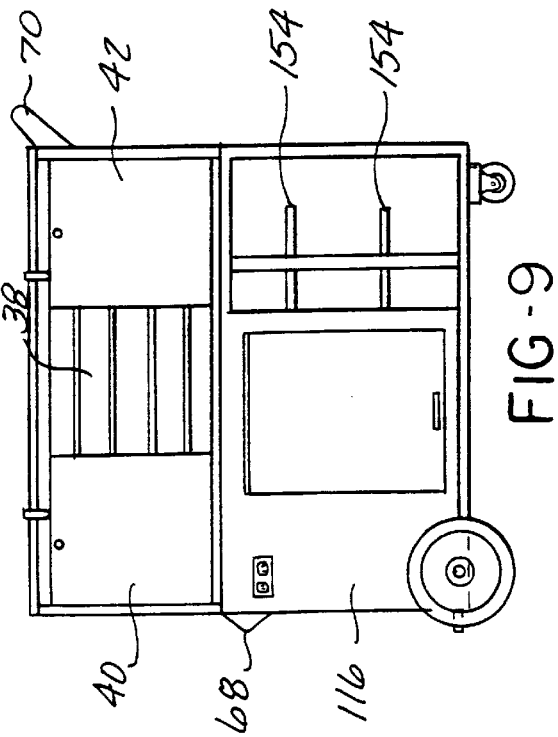
FIG. 8 is a right side elevational view of FIG. 6.
Figure 7:
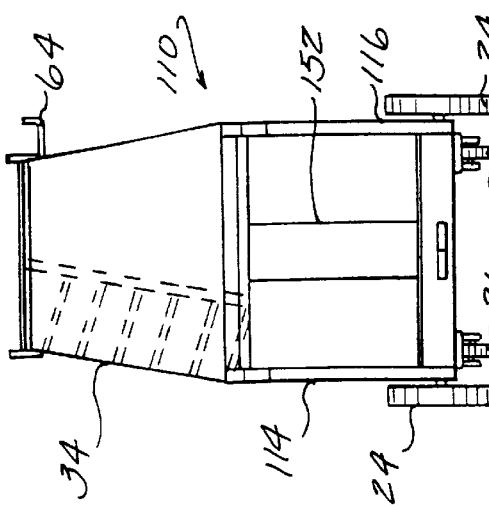
FIG. 7 is a rear elevational view of FIG. 6.
Figure 9:
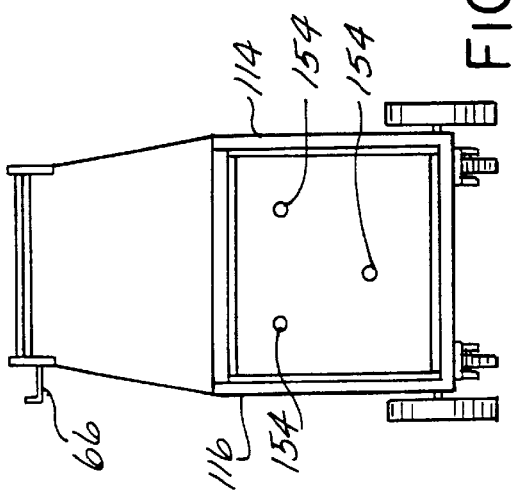
FIG. 9 is a left side elevational view of FIG. 6.

With reference first to FIGS. 4 and 5, a first preferred embodiment of the service cart 10 of the present invention is there shown.

The first preferred embodiment is equipped with storage areas specifically sized for an electrician's tools and equipment. The cart 10 comprises a rectangular base 12. Opposing side panels 14, 16 extend upwardly from base 12. Vertically oriented pyramid-shaped end members 18, 20 extend perpendicular to side panels 14, 16 and create the overall pyramid profile of the service cart 10.

Top 22 (FIG. 3) extends between end members 18, 20, and closes the service cart 10 into a unitary structure. Service cart 10 has opposing sets of wheels 24, 26 extending from base 12. Wheels 24 are large and seated outwardly from side panels 14, 16 creating a larger base area for the pyramid profile of the service cart 10. Smaller wheels 26 are preferably swivel casters for turning the service cart 10 about a small radius.

Multiple storage areas are provided within the cart 10. With reference to FIG. 3, a top view is there shown of the preferred embodiment used for all embodiments of the service cart 10. Specifically, a hinge top 28 provides access to a lockable storage area 30 in top 22. A flat work surface 32 is also provided for storing meters or other small items which are commonly used. The top 22 may also be reinforced for permanently mounting equipment such as vices that may be used on the service cart 10 at the job site.

With reference now to FIGS. 4 and 5, a plurality of bins 34, preferably sixty-six (66) in number, are provided to store fittings of small to medium size. Below bins 34 is a lockable storage area 36 for storing power tools such as a drill, saw or drive pin fastening gun. Opposite the bins 34 is a drawer storage cabinet 38, preferably comprised of a plurality of drawers, preferably 56 in number. This cabinet 38 is provided for storing equipment such as fasteners. Should additional or alternate fastener storage space be required, additional drawers can be positioned in the front face 18 (not shown). In either side of the cabinet 38 are bins 40, 42 for storing other equipment. The bins are provided with locks 44, 46. The tops of the bins swivel downward from hinges 48, 50 allowing ease of access into the storage area due to the pyramid profile of the service cart 10.

With reference now to FIG. 4, an open storage area is there shown at 52. This area is provided for storing conduit benders. The storage area 52 preferably extends the length of the service cart 10. Where additional fastener storage drawers are provided in this region, it is understood that this open storage area 52 will be shortened or modified.

With reference now to FIG. 5, a plurality of dowel-like pins 54 extend between vertical and horizontal partitions 56, 58 which are supported by side panels 14, 16. Pins 54 are provided to store electrical wiring 60. The wiring 60 can be drawn from the cart 10 whenever needed by the tradesman. Service cart 10 is also provided with an electrical outlet 62 for connecting power tools to a remote electrical source.

A plurality of retractable fingers 64, 66 extend perpendicular to the tapered profile of side panel 16. Fingers 64, 66 provide support for hanging tools, such as ladders or bundles of conduit. The acute angle of the fingers 64, 66 to the base 12 of the service cart 10 prevents the supported equipment from rolling off the end of the fingers 64, 66. A plurality of handles 68, 70 are provided on either end 18, 20 of the cart 10 to push or pull the cart as necessary.

With reference now to FIGS. 6 through 9, a second preferred embodiment is there shown for transporting equipment for a plumber. The cart 110 is essentially similar to the electrician's cart shown in FIGS. 4 and 5 with some modifications to accommodate specific plumbing equipment. Specifically, open storage area 152 is capable of storing a forty (40) cubic foot acetylene tank with accompanying hose, tip and gauge. Dowel-like pins 154 extend parallel with side panels 114, 116 from partition 172. Pins 154 can be used to store coiled copper or flexible plastic tubing. Alternately, the dowel-like pins 154 can be replaced by a plurality of vertical dividers (not shown) which extend from the base 112 to the upper surface of the opening. The dividers can be positioned in such a manner as to define a plurality of narrow storage spaces to accept copper coils and wider spaces to accept acetylene tanks. It is to be understood that such spaces can be equipped with suitable clamps or holders to secure the devices in the associated openings.

In this embodiment, the drawers 38 can be replaced by a plurality of smaller parts drawers or a combination of parts drawers and storage spaces for small parts (not shown). If desired, the top can be recessed to permit temporary storage and can be reinforced with a suitable vise mounting plate to permit addition of vise grips (not shown). The cart 110 can also optionally be outfitted with a suitable tool holder (not shown) for storing and carrying a plurality of power tools adjacent to the drawers 38.

With reference now to FIGS. 10 through 13, a third preferred embodiment is there shown for transporting finished carpentry tools. Carpenter's cart 210 is provided with all the amenities described in the electrician's cart 10 above. The carpenter's service cart 210 is preferably provided with a narrower overall base 212 to enable the cart 210 to be transported around corners in houses and down narrow hallways without damaging walls. Bins 234 are preferably larger to accommodate small power tools such as air gun nailers and cordless drills. It is to be understood that the size and orientation of the bins 234 can be altered as necessary to accommodate tool storage. Drawers 240, 242 are provided opposite bins 234 to store additional hand and power tools. Drawers 240, 242 and bins 234, preferably, have locks to provide permanent storage of these tools. Opposite the drawer and bin area of the service cart 210 is a flat mounting base 272 for permanently mounting large power tools such as a miter saw. Base 272 provides enough open area for actual use of the saw or other power tool from the service cart 210. This surface may optionally be hinged to permit access to the storage area located immediately below in which an air compressor or the like can be stored. If desired, a pneumatic cylinder can be attached to the base 272 to aid lifting.

The base portion of the device can be modified from that shown in FIG. 13 to include a plurality of large storage bins and drawers immediately below bins 234 to accommodate nails, fasteners, etc.

All three embodiments of the service cart may also be provided with a lockable storage area 274 in the base 212 of the service cart 210.

With reference now to FIGS. 1 through 3, a preferred embodiment of means for transporting the cart into and out of a vehicle is there shown.

With reference first to FIG. 1, van 300 is there shown with a service cart 10 being transported out of the van 300. A ramp 310 is stored in the base 312 of the van 300 inside a drawer area 314. The drawer area 314 is attached to the floor 312 of the van 300 and forms a guide on its upper surface onto which the wheels of the cart rest during transport. In this way, the service cart 10 rests in the drawer area 314 positioned on the floor 312 of the van 300 and is maintained in position by the upper surface during transportation.

A winch 316 is provided for easier loading or unloading of the service cart 10 from the van 300. The winch 316 may be electrical or mechanical.

With reference now to FIG. 2, a profile of the first embodiment of ramp 310 is there shown. The ramp 310 is comprised of two separate planks 318, 320. Each plank is provided with a rectangular extrusion 322 on its outer edge 324 to accommodate the rotation of the larger wheels 24. A triangular extrusion 326 is provided on the inner edge 328 of planks 318, 320 to accommodate rotation of swivel casters 26.

With reference to FIG. 3, service cart 10 is there shown having a hook 330 extending from end 20 for attachment to winch 316.

To transport carts 10 in and out of van 300, winch 316 is attached to hook 330 at the front of the cart 10. The winch 316 is activated to draw cart 10 up ramps 310 into the van 300. Ramps 310 are then slid into the drawer area 314 and stored permanently until further use. The service carts 10 may be piggybacked into and out of the van 300 if several are used at once. To accommodate this, the winch 316 is drawn underneath the foremost cart and hooked to the outermost cart. The outermost cart 10 then leads the trail of carts down the ramp area. If the carts are to be drawn into the van, the outermost cart will then push the foremost carts up the ramp into the van.

The ramp is provided with trip dogs or stops 332 to prevent the tradesman from removing the ramp completely from the drawer area. Handles 68, 70 are provided for the tradesman to transport the cart about the job site.

Figure 15:
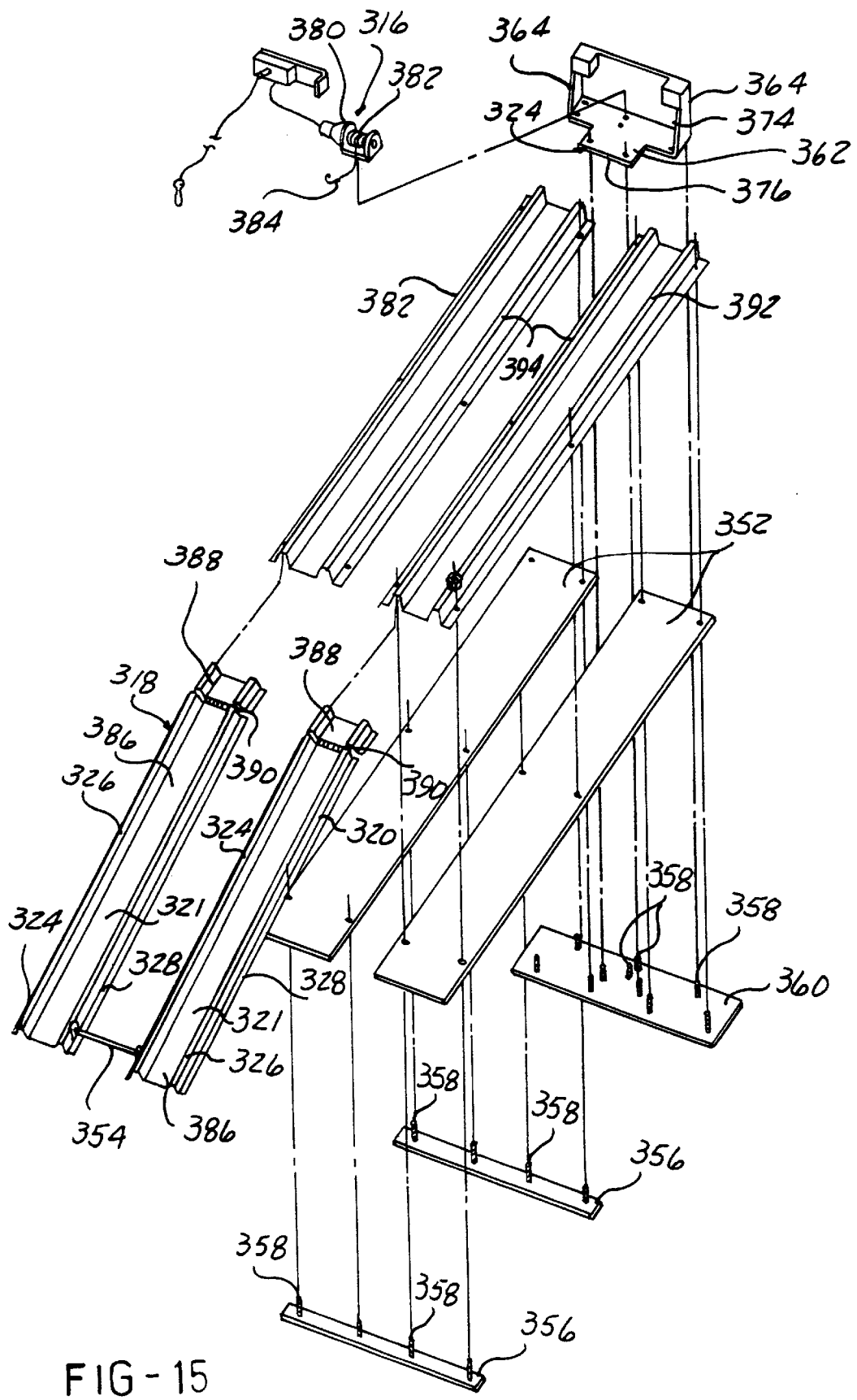
FIG. 15 is an exploded view of the ramp device of the present invention.

As shown in FIGS. 14 and 15, the ramp device 310 of the present invention may be configured according to a second embodiment. In the second embodiment, the ramp device 310 can be used in conjunction with a wheeled cart device such as service cart 10. The ramp device is suitable for removing and retaining the wheeled cart device such as service cart 10 in an automotive vehicle such as van 300. The automotive vehicle has a cargo floor 312 and sufficient internal cargo area to contain the wheeled cart device 10 to be transported.

The ramp device 310 of the second embodiment includes a pair of elongated ramp housings which are disposed parallel to the longitudinal axis of the cargo floor 312. Each ramp housing 315, 315' has an upper surface having a guide on which at least one wheel of the wheeled cart device such as service cart 10 rests during transportation in the van 300. Each ramp housing 315, 315' also has an interior region which extends longitudinally therethrough and has an end opening for provided access thereto.

The ramp device 310 of the second embodiment of the present invention also includes means for permanently securing the ramp housings 315, 315' to the cargo floor 312. As used herein, the term "permanently" is defined as including attachment methods such as welding and mechanical fastenings such as bolting the elongated ramp housings to the floor of the van 300. Any method whereby the elongated ramp housings 315, 315' are maintained in a fixed relationship with the van floor can be successfully employed as a permanent securing means. However, the term "permanently" as used herein also included methods and devices which could be retrofitted or removed upon sale or transfer of the automotive vehicle such as van 300. Preferably, a method such as welding and/or mechanically bolting is employed as the fastening method for permanently securing the ramp housing to the cargo floor. The preferred permanent securing means will be discussed in greater detail subsequently.

The ramp device 310 of the present invention also includes a pair of elongated separate planks 318, 320. Each plank 318, 320 is adapted to be contained within the interior region of one of the elongated ramp housings 315, 315' during transportation of the cart device in the van 300. The elongated planks 318, 320 are telescopically extendable from the respective elongated ramp housing 315, 315' through the end opening to a fully extended position projecting angularly downward from the vehicle cargo floor 312 to a position onto the surface on which the van 300 rests. The angular orientation of the elongated planks 318, 320 is sufficient for moving the wheeled cart device 10 from the lower surface to the vehicle cargo area and can be determined by one reasonably skilled in the art.

The elongated planks 318, 320 each have an upper face 321, an inner end, an outer end and two longitudinal edges extending from the inner end to the outer end thereof. Each elongated plank 318, 320 has at least one triangular shoulder or extrusion 326 position on the upper face and extending longitudinally along one of the longitudinal edges. The triangular shoulder is engagable with at least one of the wheels on the wheeled cart device 10 to guide the device during transit over the elongated planks 318, 320 into or out of the van 300.

The ramp device 310 of the second embodiment also includes a suitable stop member 350 which is connected with the elongated ramp housing 315, 315' at a location opposed to the respective end openings. The stop member 350 preferably extends above the ramp housings 315, 315' to a position suitable for contacting the body of the wheeled cart device and prevent further forward travel of the device during transportation in the van 300 or during loading of the wheeled cart device 10 into the cargo area.

Preferably, the ramp device 310 of the second embodiment of the present invention also includes means for facilitating the telescopic and retractive movement of the elongated planks 318, 320 relative to the respective associated elongated ramp housing 315, 315'. Preferable, the means for facilitating the telescopic and retractive movement of the elongated planks 318, 320 includes at least on lubricous sheet 352 interposed between the permanent securing means and the respective ramp housing 315, 315'. The lubricous sheet 352 can be a single sheet of tough polymeric material which extends under and between the two ramp housings 315, 315'. Alternately, the means for facilitating telescopic and retractive movement of the elongated planks can include two lubricous sheets 352, 352' as is depicted in FIGS. 14 and 15. The lubricous sheets 352, 352' are positioned such that the planks 318, 320 move over an upper surface of the sheet during telescopic and retractive movement. The lubricous sheets are, preferably, composed of a suitable tough and durable self-lubricating polymeric material such as ethylene tetrafluoroethylene, triclorotrifluoroethylene, and similar materials. Suitable materials are those commercially available from DuPont de Nemours Corporation of Wilmington, Delaware under the tradename TEFLON. It is to be understood that such materials are included for exemplary purposes. Other self lubricating sheets could be employed in the ramp device 310 of the present invention.

In order to further facilitate telescopic and retractive movement of the elongated planks 318, 320, the ramp device 310 of the present invention can also include a cross member 354 which is mounted to and extends between the elongated planks 318, 320 proximate to the respective outer ends. The cross member 354 or another suitable handle device can be employed to permit manual grasping thereof to facilitate simultaneous telescopic or retractive movement of the elongated planks prior to or after transit of the wheeled cart device 10 over the planks 318, 320.

In order to safely secure the ramp device 310 in the interior of the van 300, the ramp device 310 of the second embodiment preferably includes a plurality of elongated strap members 356 which can be securely fastened to the floor 312 of the cargo area of the vehicle 300. The elongated strap members 356 are, preferably, flat planar members having a plurality of upwardly extending studs 358 mounted thereon capable of providing secure fastening locations for the various components of the ramp device 310. The upwardly extending studs may be bolts, through bolts, integral contiguous protrusions, or the like. The upwardly extending studs may be attached to strap members 356 by conventional releasable mechanical means, or by more permanent means such as welding. The extending stud may be attached directly to the upper surface of the strap 356 thereby allowing a flat or flush mating of the lower surface of strap 356 to floor 312 of cargo area 300, or alternatively, extending stud 358 may protrude through an aperture in strap 356 for increased axial or shear loading capability of stud 358. Alternately, the means for fastening the upper members of the ramp device can include eyelets, aperture hooks or other suitable fastening means.

The elongated strap members 356 with the suitable fastening mechanism attached thereon are mounted to the floor 312 in an orientation which is essentially perpendicular to the longitudinal axis of the cargo area. Preferably, the elongated strap members 356 are mounted in an orientation which is parallel to the cargo outlet opening and will provide an orientation perpendicular to the ramp housings 315, 315' which will be mounted thereon.

The permanent securing means also includes a mounting plate 360 attached to the vehicle cargo floor 312 at a location opposed to the cargo outlet opening of the vehicle 300. The mounting plate 360 also includes mounting means 358 such as upwardly extending studs or the like as described in conjunction with the elongated strap members 356. The mounting plate is positioned in the cargo area of the van 300 so as to be in contact with stop member 350. Preferably, stop member 350 is mounted directly on mounting plate 360 and extends upward therefrom. The elongated strap members 356 and the mounting plate 360 can be attached to the cargo floor of the automotive vehicle 300 by any suitable means such as welding, bolting or the like.

Both the mounting plate 360 and the elongated strap members 356 each include an upper face which is oriented toward the ramp housings 315, 315'. The upper face of the mounting plate 360 and the respective elongated strap members 356 can either directly contact the ramp housings in situations in which the ramp device 310 of the present invention does not include lubricous sheet 352, 352' or, as shown in the embodiment depicted in FIGS. 14 and 15, the lubricous sheet 352 can be interposed between the upper face of the respective elongated strap members 356 and mounting plate 360 and the associated region of the elongated ramp housings 315, 315' such that the lubricous sheet 352 directly overlays the mounting plate 360 and the elongated strap members 356. Preferably, the upper face of the mounting plate 360 has a surface area at least three times that the surface area of any of the individual elongated strap members 356. The increased surface area of the mounting plate 360 facilitates more efficient transfer of forward momentum produced by the wheeled cart device 10 through the stop member and into the ramp housing in the event of collision during transportation of the cart in the vehicle 300. This feature will be described in greater detail subsequently.

The ramp device 310 of the second embodiment of the present invention includes a suitable stop member for maintaining position of the wheeled device in the cargo area and preventing further forward movement of the cart device in the event of collision or accident. The stop member 350 can be integrally formed with the mounting plate 360 or, as depicted in FIGS. 14 and 15, the stop member 350 can be a separate element which can be independently mounted to the mounting plate 360 by mounting means 358. As depicted in FIGS. 14 and 15, the stop member 350 includes a base adapted to be secured to the vehicle cargo floor 312 either directly or indirectly through mounting plate 360. The stop member 350 also includes a pair of upwardly extending supports 364 which extend perpendicularly from the base 362 and terminate at a location linearly above the cargo area floor 312. The upwardly extending supports 364, preferably, have a front edge perpendicular to the cargo floor and a rear edge proximate to the ramp housing 315, 315' which extends angularly toward the front end in a tapering fashion to a point which is located at between 50% and 75% of the height of the upwardly extending supports 364. The remaining portion of the upwardly extending support has a rear edge which is essentially parallel to the front edge which forms an upper region 366. The stop member 350 also has at least one bumper 370 mounted on the upwardly extending supports 364 proximate to the upper region 366. The bumper 370 is located at a position overlying the base 362 and has a contact face oriented essentially perpendicular to the upper surface of the ramp housing 315, 315' and in the same direction as the end opening of the ramp housings 315, 315'.

The bumper 370 can be equipped with any suitable material for cushioning and dampening the forward momentum of the wheeled cart device 10. Preferably, the bumper is a polymeric cushioned material which is adhered to the contact face 372 of the stop member 350.

In the second embodiment, it is preferred that the base 362 of stop member 350 be in overlying relationship with the mounting plate 360. In order to more efficiently transfer and dampen any forward momentum created by the cart device 10, the base 362 is preferably, a flat planar member having a leading edge adapted to be oriented distal to the ramp housings 315, 315' and a central extension 376 opposed to the leading edge. The central extension 376 is adapted to extend to the ramp housings 315, 315' proximate to the region defined by the inner ends of the respective housings 315, 315'. A plurality of mounting means 358 such as upwardly protruding studs are located in the central extension 376 to securely fasten the base to the mounting plate 360.

The stop member 350 can also include a cross member 378 extending between the two upwardly extending supports 364 to provide further stability. As depicted in FIGS. 14 and 15, the cross member 378 is positioned at the top of the upwardly extending supports 364 and extends contiguously therebetween.

The ramp device 310 can also include a winch mechanism 316 which, in the second embodiment, is permanently mounted on the base 362 of the stop member 350. The winch mechanism may be either mechanical or electrical. As depicted in the second embodiment in FIGS. 14 and 15, the winch mechanism 316 includes a winch motor 380, a winch cable 382 which is retractable and extendable by the winch motor 380 and means for releasably engaging the wheeled cart device 10. As depicted in the second embodiment, the means for engaging the wheeled cart device is a suitable hook member 384.

As indicated previously, the elongated planks 318, 230 are of sufficient length to provide an angular downwardly oriented slope from the cargo area floor of the automotive vehicle 300 to the surface on which the vehicle sits. These planks 318, 320 may have any suitable configuration for providing this downward orientation. As depicted in the second embodiment in FIGS. 14 and 15, the elongated planks are composed of a first elongated leg which projects angularly downward from the vehicle cargo floor when the plank 318, 320 is in the telescopically extended position. A second truncated leg 388 is slidably contained within the respective ramp housing 315, 315' and is movable between a first retracted position in which the second truncated leg 388 is proximate to the stop member and a second telescopically extended position in which the second truncated leg 388 is proximate to the end opening of the ramp housing 315, 315'. A hinge member 390 flexibly connects the first elongated leg 386 with the second truncated leg 388. The first elongated leg 386 has a length sufficient to permit suitable projection angularly downward from the vehicle cargo floor to the surface on which the van 300 sits. The second truncated leg is significantly shorter than the first elongated leg. The second truncated leg 388 has a length sufficient to permit the hinge member 390 to be extended from the ramp housing 315, 315' a sufficient distance to overlay any impediments located at the cargo entry opening of the van 300 such as a bumper or the like while the inner end (not shown) of the second truncated leg 388 is maintained inside the ramp housings 315, 315'. In this manner, the wheeled cart device 10 can traverse the elongated planks 318, 320 with minimum damage to the vehicle 300 or resistance by impediment contained therein.

The ramp housings 315, 315' may be configured in any suitable manner which will contain the retractable elongated planks 318, 320'. Preferably, in the second embodiment as depicted in FIGS. 14 and 15, the ramp housings 315, 315' each include a pair of laterally opposed walls which extend essentially perpendicular to the upper face 321 in opposed parallel longitudinal orientation thereto. The laterally opposed walls 392 each terminate in an associated outwardly extending flange 394 upon which the respective ramp housings 318, 320 is supported. As shown in FIGS. 14 and 15, the outwardly extending flanges 394 can be adapted to suitably attach to the mounting plate 360 and elongated strap members 356 by suitable mounting means 358. As depicted in the drawing figures, the outwardly extending flanges 394 can include suitable apertures through which upwardly extending studs can pass. The ramp housings 315, 315' can be fastened by any suitable manner.

When the ramp housings 315, 315' are mounted on the mounting plate 360, the forward edge of the respective ramp housings 315, 315' are positioned such that the associated edge of the mounting plate 360 forms an underlying support thereto. Thus, at least a portion of the momentum caused by forward travel of the wheeled cart device 10 will be transferred through the stop member 350 into the mounting plate 360 and onto the elongated ramp housing 315, 315'. Thus, the force generated by the forward momentum of the vehicle cart would be dampened by the weight of the cart resting on the elongated ramp housings. In this manner, when the wheeled cart device 10 is in position on the ramp device 310 of the present invention, the two elements work in concert to maintain the cart in a relatively secure fixed position. Rearward travel of the wheeled service cart is limited due to the action of the winch mechanism 316. Thus, the forward and rearward travel of the wheeled cart device 10 would be circumscribed due to the interaction of the winch mechanism 316 and the stop member 315. This would minimize the movement of the wheeled cart device due to starting and stopping of the vehicle.

As depicted in FIGS. 14 and 15, the upwardly extending supports 364 of stop member 350 are positioned central to the respective interior region of the elongated ramp housings and opposed to the respective opening. When in position, the pair of upwardly extending supports 364 also serves to limit forward travel of the respective elongated planks 318, 320 contained therein.

Having described my invention, however, many modifications thereto will become apparent to those skilled in the art to which it pertains without deviation from the spirit of the invention as defined by the scope of the appended claims.

What is claimed is:

1. A ramp device for use in a vehicle having a cargo storage area, the cargo storage area having a floor and a cargo outlet opening, the ramp device comprising:

at least one ramp housing attached to the floor of the cargo storage area, the ramp housing having at least two side panels extending upward from the floor of the cargo storage area, disposed essentially parallel to one another and essentially perpendicular to the cargo outlet opening, an upper panel extending between the side panels having an upper surface having at least one guide member located thereon, wherein the side panels and the upper panel define an interior region and an end opening in communication with the interior region, the end opening located adjacent to the cargo outlet opening;

at least one elongated plank retractably contained in the interior region of the ramp housing and telescopically extendable therefrom through the end opening to a fully extended position projecting angularly downward from the floor of the cargo vehicle, the elongated plank having an upper wheel contacting surface, two opposed outer longitudinal sides contiguous with the lower surface and at least one upwardly extending shoulder positioned on the upper surface proximate to and extending parallel to one of the longitudinal sides;

means for preventing complete removal of the elongated planks from the interior region of the ramp housing; and means for facilitating telescopic and retractive movement of the elongated plank, the facilitating means comprising at least one lubricous sheet interposed between the permanent securing means and the ramp housing.

2. The ramp device of claim 1 further comprising a winch mechanism permanently attached to the vehicle in proximity to the ramp housing at a location essentially opposed to the end opening, the winch mechanism comprising a winch motor, a winch cable having a terminal end, the winch cable retractable by the winch motor and a hook on the terminal end of the winch cable, the hook releasably engagable with an object to be drawn over the elongated planks.

3. The invention of claim 1 wherein the shoulder of the elongated plank comprises an outer side wall essentially perpendicular to the upper surface and an inner side wall forming an acute angle relative to the outer side wall defining a triangular shoulder.

4. The ramp device of claim 3 wherein the elongated plank further comprises a rectangular shoulder positioned on the upper face extending longitudinally adjacent to an outer wall opposed and parallel to the triangular shoulder, the rectangular shoulder and the triangular shoulder defining a guide for positioning wheels of the device to be conveyed thereover.

5. The ramp device of claim 3 wherein the guide member located on the upper surface of the ramp housing comprises a pair of elongated shoulders each shoulder contiguous with the adjacent side panel, the elongated shoulders each having a contour essentially similar to the triangular shoulder located on the elongated plank.

6. A ramp mechanism for use in conjunction with a wheeled cart device, the ramp mechanism suitable for removing and retaining the wheeled cart device in an automotive vehicle having a cargo floor, the ramp mechanism comprising:

a pair of elongated ramp housings attached to the cargo floor, each ramp housing having at least two side panels extending upward from the cargo floor and an upper panel extending between the side panels, the upper panel having an upper surface having a guide on which at least one wheel of the wheeled cart device rests during transport in the automotive vehicle, the side panels and the upper panel of each ramp housing defining an interior region extending longitudinally therethrough and an end opening providing access to the interior region;

means for permanently securing the ramp housing to the cargo floor;

a pair of elongated planks, each plank contained in the interior region of one of the elongated ramp housings and telescopically extendable therefrom through the end opening to a fully extended position projecting angularly downward from the vehicle cargo floor, the elongated planks each having an upper face, an inner end, an outer end, and two outer longitudinal edges extending from the inner end to the outer end and at least one shoulder positioned on the upper face extending longitudinally along one of the outer edges, the shoulder engagable with at least one of the wheels on the wheeled cart device; and a stop member connected to the elongated ramp housings at a location opposed to the end openings; and means for facilitating telescopic and retractive movement of the elongated planks, the facilitating means comprising at least one lubricous sheet interposed between the permanent securing means and the respective ramp housing.

7. The ramp mechanism of claim 6 further comprising:

a cross member mounted to and extending between the elongated planks proximate to the outer ends thereof.

8. The ramp mechanism of 6 wherein the permanent securing means comprises:

a plurality of elongated strap members;

a mounting plate in contact with the stop member; and means for permanently attaching mounting plate and the elongate strap members to the cargo floor of the automotive vehicle, the elongated strap members attached at positions underlaying and essentially perpendicular to the ramp housings, the mounting plate attached to the ramp housings at a position opposed to the end openings in the respective ramp housings.

9. The ramp mechanism of claim 8 wherein the mounting plate and each of the elongated strap members has an upper face which contacts the ramp housings, the upper face of the mounting plate having a surface area at least three times that of the surface area of an individual mounting strap.

10. The ramp mechanism of claim 6 wherein the stop member comprises:

a base adapted to be secured to the vehicle cargo floor;

a pair of upwardly extending supports extending perpendicularly upward from the base, the supports positioned proximate to the inner ends of the ramp housings;

at least one bumper mounted on the upwardly extending supports at a position overlying the base, the bumper having a contact face oriented essentially perpendicular to and in the same direction as the end opening of the ramp housings.

11. The ramp mechanism of claim 10 wherein the base is overlying relationship with the means for permanently securing the elongated ramp housings, the base having a leading edge distal to the ramp housings, and a central extension opposed to the leading edge, the central extension adapted to extend between the ramp housings proximate to inner ends opposed to the end openings thereof.

12. The ramp mechanism of claim 10 wherein the stop member further comprises:

at least two bumpers located proximate to a respective upwardly extending support; and a cross member extending perpendicularly between the two support members.

13. The ramp mechanism of claim 10 further comprising a winch mechanism permanently mounted on the base of the stop member, the winch mechanism comprising a winch motor, a winch cable retractable and extendable by the winch motor, and means for releasably engaging the wheeled cart device.

14. The ramp mechanism of claim 6 wherein the elongated planks each comprise:

a first elongated leg projecting angularly downward from the vehicle cargo floor when the plank is in the telescopically extended position;

a second truncated leg slidably contained within the respective ramp housing and movable between a first retracted position wherein the second truncated leg is proximate to the stop member and a second telescopically extended position in which the second truncated leg is proximate to the end opening of the ramp housing; and a hinge member flexibly connecting the first elongate leg with the second truncated leg.

15. A ramp mechanism for use in conjunction with a wheeled cart device, the ramp mechanism suitable for removing and retaining the wheeled cart device in an automotive vehicle having a cargo floor, the ramp mechanism comprising:

a pair of elongated ramp housings attached to the cargo floor, each ramp housing having at least two side panels extending upward from the cargo floor and an upper panel extending between the side panels, the upper panel having an upper surface having a guide on which at least one wheel of the wheeled cart device rests during transport in the automotive vehicle, each ramp housing defining an interior region extending longitudinally therethrough and an end opening providing access to the interior region;

means for permanently securing the ramp housing to the cargo floor;

a pair of elongated planks, each plank contained in the interior region of one of the elongated ramp housings and telescopically extendable therefrom through the end opening to a fully extended position projecting angularly downward from the vehicle cargo floor, the elongated planks each having an elongated leg terminating in an outer end, a truncated leg terminating in an inner edge, and a hinge member flexibly connecting the elongated leg with the truncated leg, the truncated leg positioned at a location in the ramp housing proximate to the end opening when the plank is in the fully extended position and the elongated leg projecting angularly downward from the vehicle cargo floor such that the outer end contacts an exterior surface on which the automotive vehicle is parked when the plank is in the fully extended position, each elongated plank further having an upper surface and two outer longitudinal edges extending from the inner end to the outer end, and at least one triangular shoulder positioned on the upper face extending longitudinally along one of the outer edges, the triangular shoulder engagable with at least one of the wheels on the wheeled cart device; and a stop member attached to the securing means at a location opposed to the end openings of the elongated ramp housings.

16. The ramp mechanism of claim 15 wherein the permanent securing means comprises:

a plurality of elongated strap members;

a mounting plate in contact with the stop member;

means for permanently attaching mounting plate and the elongate strap members to the cargo floor of the automotive vehicle, the elongated strap members attached at positions underlaying and essentially perpendicular to the ramp housings, the mounting plate attached to the ramp housings at a position opposed to the end openings in the respective ramp housings; and means for facilitating telescopic and retractive movement of the elongated planks relative to the respective elongated ramp housings.

17. The ramp mechanism of claim 16 wherein the ramp housings each have a longitudinal length, each of the elongated planks has a longitudinal length greater than the longitudinal length of the respective ramp housing; and wherein the plank movement facilitation means comprises at least one sheet composed of a lubricous material interposed between the permanent securing means and the respective ramp housing, the lubricous sheet having an essentially rectangular upper face and a longitudinal length greater than the length of the respective plank member, the lubricous sheet extending longitudinally outward beyond the end opening of the ramp housing a sufficient distance to support the respective hinge members when the planks are telescopically extended to their full extent of travel.

18. The ramp mechanism of claim 16 wherein the mounting plate and each of the elongated strap members has an upper face oriented toward the ramp housings, the upper face of the mounting plate having a surface area at least three times that of the surface area of an individual mounting strap, and wherein the stop member is contiguously connected to the ramp housings, the stop member comprising:

a base overlying the means for permanently securing the elongated ramp housings;

a pair of upwardly extending supports extending perpendicularly upward from the base, the supports positioned proximate to the inner ends of the ramp housings;

at least one bumper mounted on the upwardly extending supports at a position overlying the base, the bumpers having a contact face oriented essentially perpendicular to and in the same direction as the end opening of the ramp housings.

19. The ramp mechanism of claim 18 further comprising a winch mechanism permanently mounted on the base of the stop member, the winch mechanism comprising a winch motor, a winch cable retractable and extendable by the winch motor, and means for releasably engaging the wheeled cart device.

20. A ramp mechanism for use in conjunction with a wheeled cart device, the ramp mechanism suitable for removing and retaining the wheeled cart device in an automotive vehicle having a cargo floor, the ramp mechanism comprising:

a pair of elongated ramp housings, each ramp housing having an upper surface, a pair of laterally opposed walls perpendicular to and contiguous with the upper surface lower surface, and a pair of outwardly extending flanges, each flange contiguous with and perpendicular to an associated wall, the upper surface having a guide on which at least one wheel of the wheeled cart device rests during transport in the automotive vehicle, each ramp housing also having an interior region extending longitudinally therethrough and an end opening providing access to the interior region;

means for permanently securing the outwardly extending flanges of the ramp housing to the cargo floor;

a pair of elongated planks, each plank contained in the interior region of one of the elongated ramp housings and telescopically extendable therefrom through the end opening to a fully extended position projecting angularly downward from the vehicle cargo floor, the elongated planks each having an elongated leg terminating in an outer end, a truncated leg terminating in an inner edge, and a hinge member flexibly connecting the elongated leg with the truncated leg, the truncated leg positioned at a location in the ramp housing proximate to the end opening when the plank is in the fully extended position and the elongated leg projecting angularly downward from the vehicle cargo floor such that the outer end contacts an exterior surface on which the automotive vehicle is parked when the plank is in the fully extended position, each elongated plank further having an upper surface and two outer longitudinal edges extending from the inner end to the outer end, and at least one triangular shoulder positioned on the upper face extending longitudinally along one of the outer edges, the triangular shoulder engagable with at least one of the wheels on the wheeled cart device;

a cross member mounted to and extending between the elongated planks proximate to the outer ends thereof;

at least one sheet composed of a lubricous plastic material capable of facilitating telescopic and retractive movement of the elongated planks relative to the respective elongated ramp housings, the sheet of lubricous plastic interposed between the permanent securing means and the respective ramp housing, the lubricous sheet having an essentially rectangular upper face and a longitudinal length greater than the length of the respective plank member, the lubricous sheet extending longitudinally outward beyond the end opening of the ramp housing a sufficient distance to support the respective hinge members when the planks are telescopically extended to their full extent of travel; and a stop member attached to the securing means and extending upwards therefrom, the stop member positioned at a location opposed to the end openings of the elongated ramp housings, the stop member comprising:

a base overlying the means for permanently securing the elongated ramp housings;

a pair of upwardly extending supports extending perpendicularly upward from the base, the supports positioned proximate to the inner ends of the ramp housings;

at least one bumper mounted on the upwardly extending supports at a position overlying the base, the bumpers having a contact face oriented essentially perpendicular to and in the same direction as the end opening of the ramp housings.

21. The ramp mechanism of claim 20 wherein the mounting plate and each of the elongated strap members has an upper face which contacts the ramp housings, the upper face of the mounting plate having a surface area at least three times that of the surface area of an individual mounting strap.

* * * * *